US012610175B2

(12) United States Patent
Ahovi et al.

(10) Patent No.: US 12,610,175 B2
(45) Date of Patent: Apr. 21, 2026

(54) HEADSET HAVING HEADBAND WITH ELASTIC BAND AND FABRIC

(71) Applicant: Microsoft Technology Licensing, LLC, Redmond, WA (US)

(72) Inventors: Elie Eyram Ahovi, Seattle, WA (US); Eric Paul Witt, Redmond, WA (US); Paul Ryan Sandoval, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 166 days.

(21) Appl. No.: 18/397,954

(22) Filed: Dec. 27, 2023

(65) Prior Publication Data

US 2025/0220335 A1 Jul. 3, 2025

(51) Int. Cl.
*H04R 1/10* (2006.01)
*H04R 5/033* (2006.01)

(52) U.S. Cl.
CPC ......... *H04R 1/1066* (2013.01); *H04R 1/1008* (2013.01); *H04R 5/0335* (2013.01)

(58) Field of Classification Search
CPC ... H04R 1/1066; H04R 1/1008; H04R 5/0335
USPC ........................................................ 381/374
See application file for complete search history.

(56) References Cited

U.S. PATENT DOCUMENTS 11,838,716 B1 * 12/2023 Helbert ................ A61B 5/0295
2019/0110122 A1 * 4/2019 Zelnick ................ H04R 1/1066
2022/0286767 A1 * 9/2022 Neergaard ........... H04R 5/0335
2023/0164476 A1 * 5/2023 Jakobsen ............. H04R 1/1058
381/378

* cited by examiner

*Primary Examiner* — Sean H Nguyen
(74) *Attorney, Agent, or Firm* — Alleman Hall LLP

(57) ABSTRACT

A headset is provided, including an earcup, the earcup including an audio transducer configured to emit audio to a respective ear of a user. The headset further includes a headband including an elongated and curved support structure having a pair of respective ends, the headband being coupled at one of the respective ends to the earcup. The headband further includes an elastic band coupled to and stretching between the ends of the support structure, the elastic band being concave down in shape. The headband further includes fabric coupled to the support structure at locations above the elastic band and extending to wrap underneath at least a portion of the elastic band to form a saddle shape that supports the elastic band from the underside at least at a head-contacting portion of the headband.

20 Claims, 5 Drawing Sheets

HEADSET HAVING HEADBAND WITH ELASTIC BAND AND FABRIC

BACKGROUND

A headset is a hardware device that connects to an audio source such as a mobile device, computer, gaming console, or other equipment, allowing the user to listen to audio while keeping their hands free. It generally consists of ear cups and a headband. The headband is the part of the headset that goes over the user's head and connects the ear cups. The headband is designed to provide a comfortable and secure fit for the user. However, users often find wearing a headset for prolonged periods of time to be uncomfortable. Technical challenges exist to providing comfortable and durable headbands, as discussed below.

SUMMARY

A headset is provided. According to one aspect, the headset includes an earcup, the earcup including an audio transducer configured to emit audio to a respective ear of a user. The headset further includes a headband including an elongated and curved support structure having a pair of respective ends, the headband being coupled at one of the respective ends to the earcup. The headband includes an elastic band coupled to and stretching between the ends of the support structure, the elastic band being concave down in shape. The headband further includes fabric coupled to the support structure at locations above the elastic band and extending to wrap underneath at least a portion of the elastic band to form a saddle shape that supports the elastic band from the underside at least at a head-contacting portion of the headband. The elastic band and the fabric are biased against each other, such that the elastic band pushes down against the fabric in tension and the fabric pulls up in tension against the elastic band.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Conventional headbands for audio headsets typically use foam under fabric or a floating elastic strip to provide cushioning and comfort to a user's head. The fabric helps to absorb sweat and prevent the headset from slipping. However, these headbands can be uncomfortable, as they can cause pressure points on the user's head. In particular, the foam tends to flatten out and create a pressure point, which can be uncomfortable for people with larger or sensitive heads. Additionally, the foam under the fabric can wear out over time, which can lead to a decrease in comfort and support. For users who wear their headsets for extended periods of time, even a small amount of discomfort can compound and become unbearable for the user. As many users are using their headsets for work related tasks, the user is often unable to remove the headset, which can result in a frustrating and painful situation.

Figure 1:
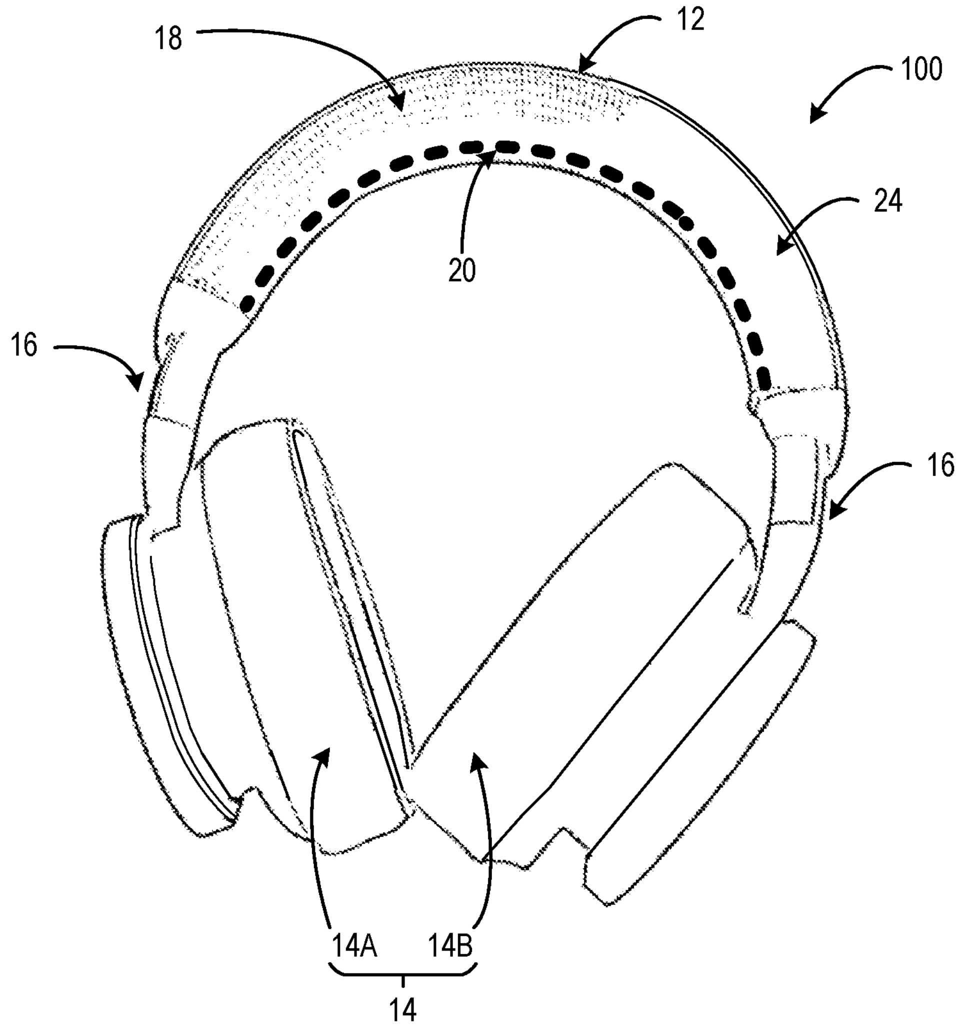
FIG. 1 illustrates a schematic view of an example headset including earcups and a headband.

To address the issues described above, FIG. 1 illustrates a schematic view of an example headset 100 including earcups 14A, 14B and a headband 12. The headset 100 may be for listening to audio or communicating with others while keeping your hands free. The headset 100 may be also for video conferencing, remote schooling, online gaming, and listening to music on the go. The headset 100 can be either wired or wireless. The headset 100 includes an earcup 14, in which the earcup includes an audio transducer configured to emit audio to a respective ear of a user. It will be appreciated that the headset 100 may have a single earcup or multiple earcups including a pair of earcups as depicted in FIG. 1. Furthermore, the earcup 14 can be an on-ear earcup or over-ear earcup. The audio transducer is a component that converts electrical signals into sound waves, and is typically located inside the earcup 14. The earcup 14 may be made of materials such as foam, leather, or velour, and may be either open or closed-back. The headset 100 may further include a microphone (not shown) can be used for various purposes such as recording audio, making phone calls, or communicating with others in a gaming environment.

The headset 100 further includes the headband 12 that is designed to fit over the head and keep the earcups 14 in place. The headband 12 includes an elongated and curved support structure 24 having a pair of respective ends, the headband being coupled at one of the respective ends 16 to the earcup 14. It will be appreciated that when the earcup 14 is one of the pair of earcups 14A, 14B, each of the pair of earcups 14A, 14B is coupled to one of the respective ends of the support structure 24, as shown in FIG. 1. The ends of the support structure 24 may include curved mounting surfaces that are convexly and downwardly curved on a lower side of the rigid structure, and the fabric 18 may be mounted to the curved mounting surfaces. The elongated and curved support structure 24 of the headband 12 is designed to provide a comfortable and secure fit for the user. The elongated shape of the headband allows for a greater range of adjustment, making it easier to find a suitable fit for different head sizes and shapes. The support structure 24 may be rigid plastic that runs from the first earcup 14A to the second earcup 14B. The plastic material of the support structure 24 is usually light enough not to press on your head, but strong and durable enough to withstand wear and tear. It will be appreciated that the support structure 24 may be made entirely or partially of metal, such as steel or aluminum, or an alloy thereof. The headband 12 further includes fabric 18 and an elastic band 20, with the elastic band 20 located inside the fabric 18 such that the elastic band 20 indirectly touches on the user's head via the fabric 18. The fabric 18 may be a breathable or mesh fabric such that it provides a comfortable fit on the user's head.

Figure 2:
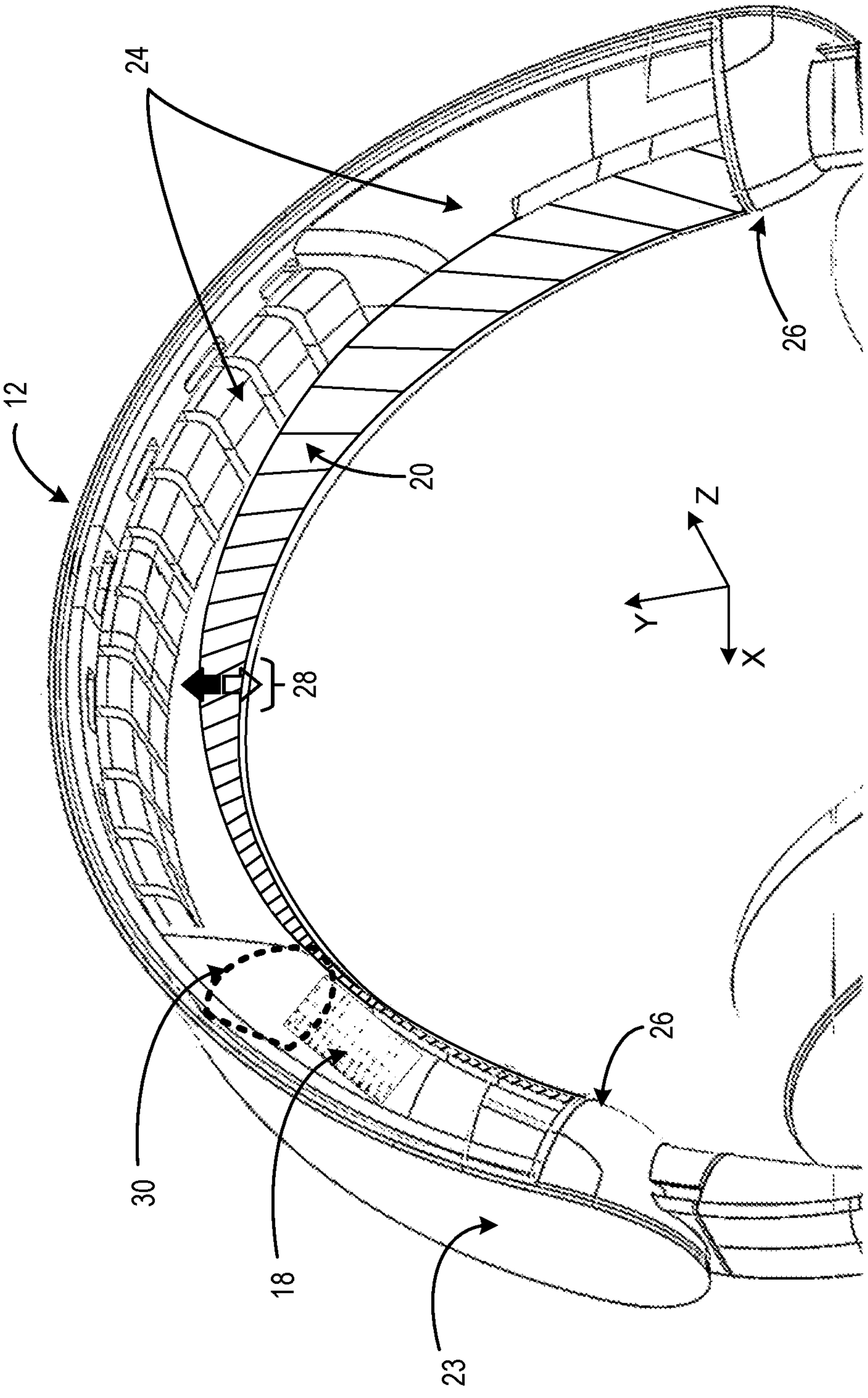
FIG. 2 illustrates a schematic view of an example headband including fabric and an elastic band located inside the fabric.

FIG. 2 illustrates a schematic view of an example headband 20 including the fabric 18 and the elastic band 20 located inside the fabric 18, which illustrates internal components within headband 12. As depicted in FIG. 2, the headband 12 includes the elastic band 20 coupled to and stretching between the ends 26 of the support structure 24, in which the elastic band 20 is concave down in shape, as viewed from the front in FIG. 1. It will be appreciated that the ends 26 of the support structure 24 are not limited to the shape and design depicted in FIG. 2, but could be, for example, shorter, longer, differently shaped in cross section, invisible (i.e., covered by the fabric entirely) or integrated into the earcup structure. Continuing with FIG. 2, the elastic band 20 may have a shape that is similar to the graph of a concave down function. A concave down function is one where the slope of the curve decreases as it moves from left to right. The elastic band 20 may be placed at the bottom or lower side of the headband 12, which is the right above the user's head. It will be appreciated that the elastic band 20 may be also placed in the middle of the headband 12, height-wise.

The headband 12 further includes the fabric 18 coupled to the support structure 24 at locations above the elastic band 20 and extending to wrap underneath at least a portion of the elastic band 20 to form a saddle shape 30. The planes of principal curvature of the saddle shape 30 are the X-Y plane and the Y-Z plane (see X, Y, and Z directions labeled in FIG. 2). The top surface 23 of the support structure 24 is substantially a curved plane, and the fabric 18 coupled to the support structure 24 forms a C-shape in the Y-Z plane and also curves concavely downwardly from earcup to each cup in the X-Y plane, and these curvatures provide the saddle shape 30. The saddle shape 30 may be defined by the relative tension of the elastic band 20 and the stretchability of the fabric 18. The saddle shape 30 supports the elastic band 20 from the underside at least at a head-contacting portion of the headband 12 throughout an entire length of the head contacting portion. In some examples, the saddle shape continues beyond a head contacting portion of the headband. The saddle shape is a type of curve that is similar to the shape of a horse saddle and is concave up in the middle and concave down on the sides.

Continuing with FIG. 2, the elastic band 20 and the fabric 18 are biased against each other, such that the elastic band 20 pushes down against the fabric 18 in tension and the fabric 18 pulls up in tension against the elastic band 20, as shown by the arrows 28, of which a solid arrow points upward and an outlined arrow points downward, indicating opposing tensile forces in equilibrium. The combination of the stretchy fabric 18 and the elastic band 20 that bridges the arch of the headband 12 achieves this effect. This construction can help to provide a comfortable and snug fit for the headband wearer. The elastic band 20 is stretchy and pulls down to give a curvature on the inner diameter of the headband 12. The mesh fabric 18 then pulls it up into the form factor, resulting in a curvature that has stretch in multiple directions. The result is a resilient lower surface that can contact the head and allow the head to deform the headband a distance into an airgap 34 (see FIG. 4) within the headband. This allows for ample ventilation and uniform pressure distribution on the user's head.

Figure 3A:
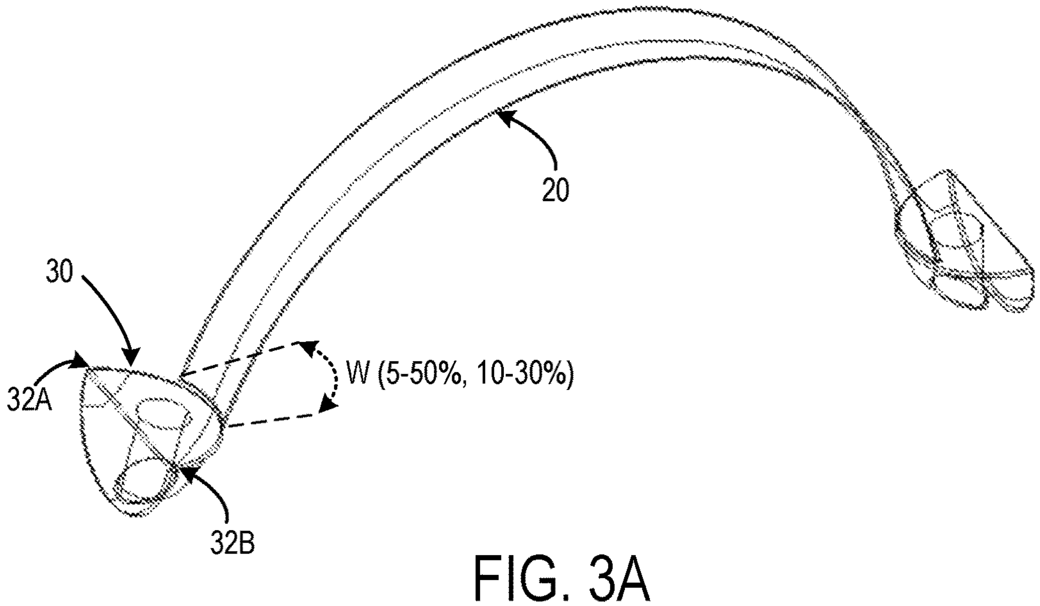
FIG. 3A illustrates a perspective view of the elastic band of the headband of FIG. 2.
Figure 3B:
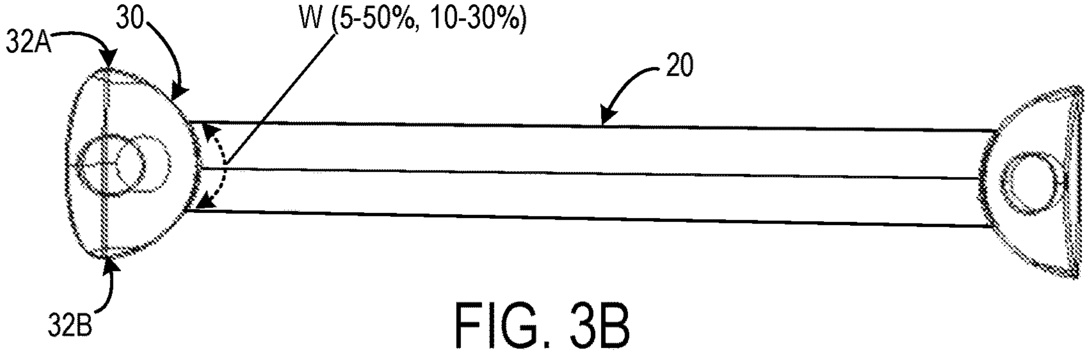
FIG. 3B illustrates a top view of the elastic band of the headband of FIG. 2.

FIG. 3A illustrates a perspective view of the elastic band 20 that is concave down in shape, and FIG. 3B illustrates a top view of the elastic band 20 seen from the above. In FIGS. 3A and 3B, the support structure 24 and the fabric 18 are not shown. As depicted in FIGS. 3A and 3B, the elastic band 20 has a width W that extends across a trough of the saddle shape 30. The width W of the elastic band 20 may extend between 5% and 50% of the distance between respective attachment points 32A, 32B of the fabric 18 to the headband on opposite sides of the trough of the saddle shape 30 as viewed from above. The higher the percentage of W is, the wider the width of the elastic band 20 is. For instance, at W=100%, the width of the elastic band 20 equals to the full arc length of the saddle shape 30, while at W=50%, the width of the elastic band 20 equals half of the full arc length of the saddle shape 30. It will be appreciated that the width W of the elastic band 20 can be narrower, extending between 10% and 30% of the distance between the attachment points 32A, 32B. The width W of the elastic band 20 plays a role in the shape of the headband 12. A thin elastic band like a drawstring cord down the center would make the saddle shape or D-shape look more pointy. On the other hand, a wider elastic band would create a flatter, smoother curve of the elastic band or D-shape.

Figure 3C:
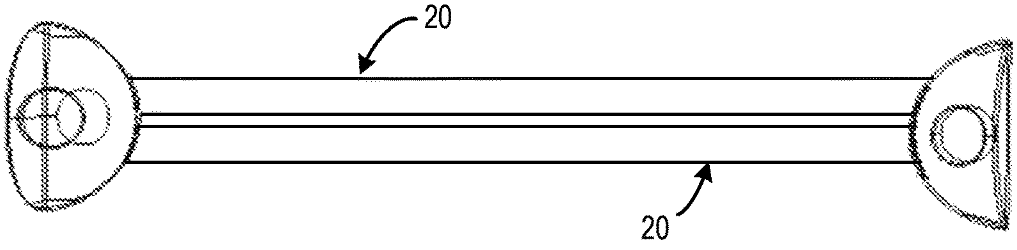
FIG. 3C illustrates a top view of a plurality of elastic bands of the headband of FIG. 2.

Furthermore, FIG. 3C illustrates a top view of a plurality of elastic bands of the headband 12. As shown in FIG. 3C, it will be appreciated that the elastic band 20 may be one of a plurality of elastic bands (e.g., two elastic bands in FIG. 3C) stretching between the ends of the support structure 24 such that the plurality of elastic bands may be placed inside the headband 12. If a wider band area is adopted, using multiple strands of elastic bands instead of a single elastic band may be better to even out the loads to accommodate a wider band space.

Figure 4:
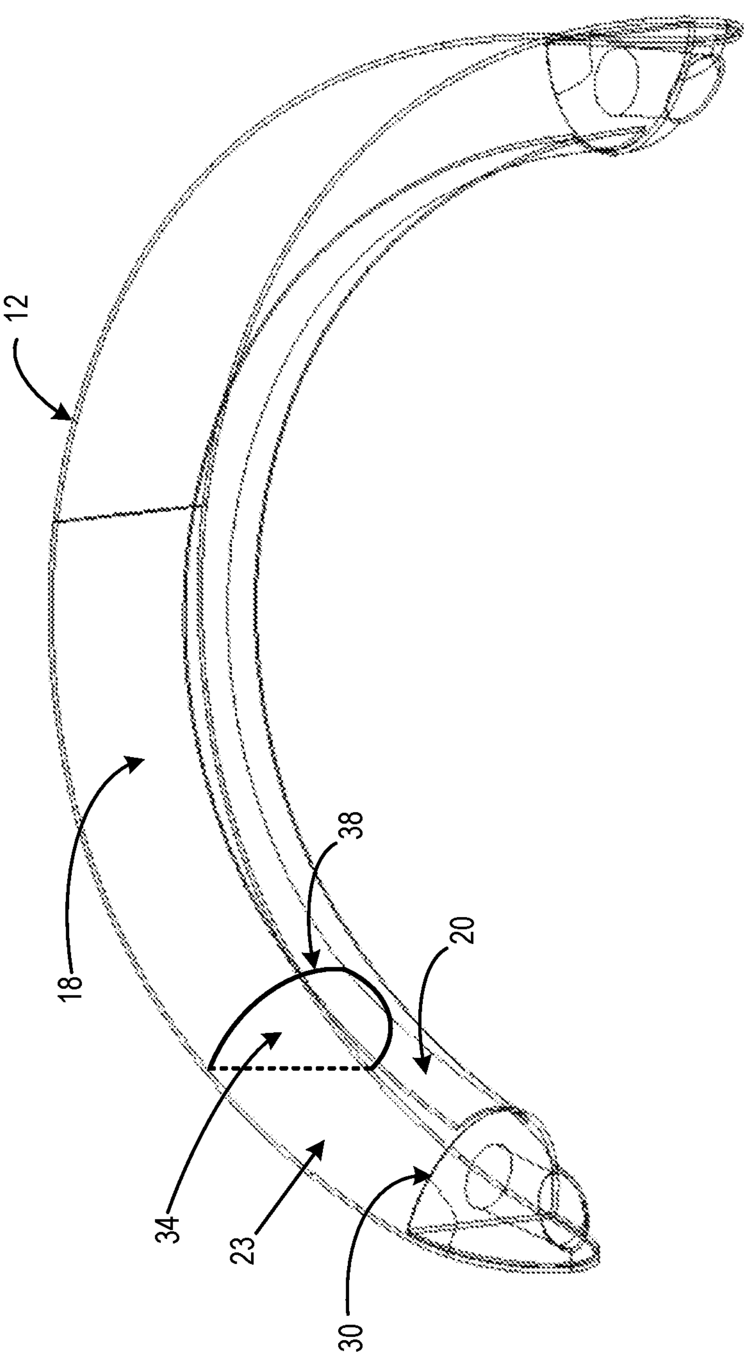
FIG. 4 illustrates a schematic view of an example headband including the fabric wrapping underneath at least a portion of the elastic band to form a saddle shape.

FIG. 4 illustrates a schematic view of an example headband including the fabric 18 wrapping underneath at least a portion of the elastic band 20 to form the saddle shape 30. The fabric 18 and elastic band 20 may be configured to be resiliently deformable into an airgap 34 within the headband 12 where the fabric 18 has a C-shaped cross section 38 in the saddle shape 30, in which the cross section is taken at an apex of the headband 12 in an anterior/posterior direction. The C-shaped cross section 38 of the fabric 18 and the top surface 23 of the headband 12 surround the airgap 34 such that the airgap 34 has a D-shaped cross section within the headband 12. The airgap 34 creates space between the support structure 24 and the elastic band 20. Since the support structure 24 includes a hard plastic, it is important to balance the elastic, width, and pretension of the elastic band 20 and have the airgap 34 to achieve the right balance between initial soft cushion and avoiding hard plastic contact with the top of the head of the user.

It will be appreciated that the fabric 18 and the elastic band 20 may be removably replaceable so that different users with different sizes of head and comfort preferences can replace the headband to adjust to a headband of a fabric type the user finds comfortable and stylish. This allows the user to choose different colors and designs of the fabric 18 as well as different tensions of the elastic band 20 and different types of fabric.

Figure 5:
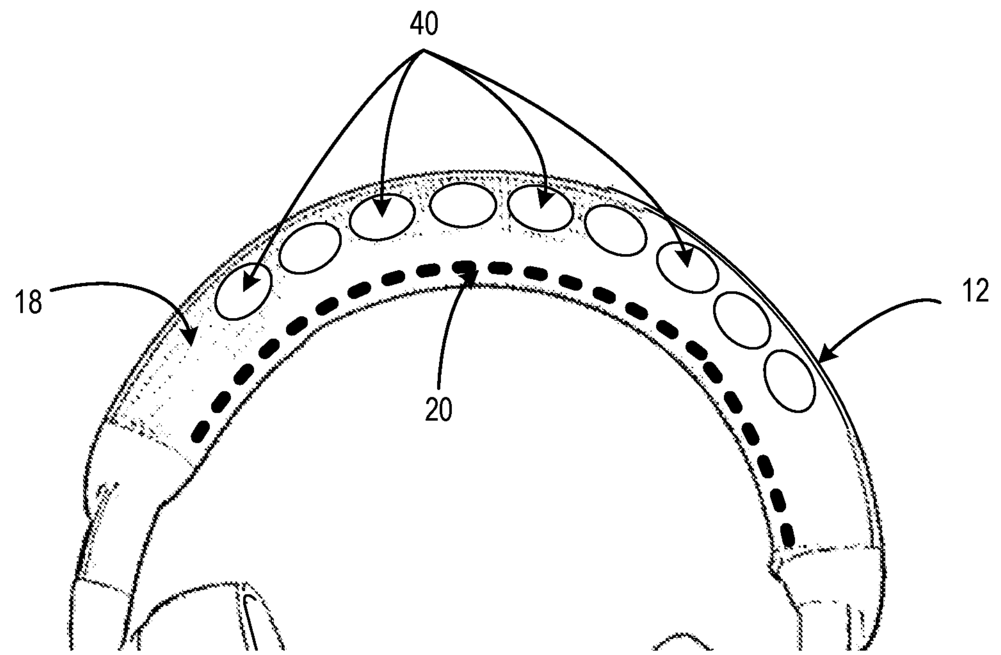
FIG. 5 illustrates a schematic view of an example headband including the fabric with gaps.

Moreover, as shown at FIG. 5, it will be appreciated that the fabric 18 does not need to be continuous across the arc to wrap the elastic band 20. Instead, the fabric 18 can have some gaps 40 enough to provide counter tension to the elastic band 20. This feature can provide varying densities of openings throughout the length of the headband 12, which can make the fabric lighter and more breathable. Furthermore, the middle part of the headband 12 can have a more open knit mesh that allows for ample ventilation, while the lower side part of the headband 12 which is closer to the elastic band 20 can have more dense knit mesh. Towards the sides, the knit structure can become more solid with higher opacity and less breathability than in the center, where heat from the user's head can become concentrated. Moreover, it will be appreciated that a material other than the fabric 18 can be used to provide sufficient counter tension to the elastic band 20.

The headband 12 of the headset 100 described herein provides several technical advantages by utilizing the fabric 18 and the elastic band 20. The combination of the fabric 18 and the elastic band 20, instead of foams, provides a lighter and more breathable headband, which can help reduce discomfort during extended use. Furthermore, the elastic band distributes the pressure across the whole headband on top of the head, which can help reduce pressure points and increase comfort. Additionally, the combination elasticity of both provides visually a full shaped headband, which can help improve the overall look of the headset. The combination of the fabric and elastic have the advantage that they can retain or regain their shape over time. The combination of the fabric and elastic can be used repeatedly for a lengthy time without appreciable sagging, which can help maintain the headset's durability, comfort, and appearance throughout it's useful life. Finally, the headband has the advantage of being a floating solution with the head floating into the airgap and resting with relatively even pressure on the combination of fabric and elastic without contacting any foam or other material within the headset, and this can help reduce the weight of the headset and improve comfort.

The following paragraphs provide additional description of the subject matter of the present disclosure. One aspect provides a headset including an earcup and a headband. According to this aspect, the earcup may include an audio transducer configured to emit audio to a respective ear of a user. The headband may include an elongated and curved support structure having a pair of respective ends, the headband being coupled at one of the respective ends to the earcup. The headband may further include an elastic band coupled to and stretching between the ends of the support structure, the elastic band being concave down in shape. The headband may further include a fabric coupled to the support structure at locations above the elastic band and extending to wrap underneath at least a portion of the elastic band to form a saddle shape. The saddle shape may support the elastic band from the underside at least at a head-contacting portion of the headband.

According to this aspect, the earcup may be one of a pair of earcups, and each of the pair of earcups may be coupled to one of the respective ends of the support structure.

According to this aspect, the elastic band and the fabric may be biased against each other, such that the elastic band pushes down against the fabric in tension and the fabric pulls up in tension against the elastic band.

According to this aspect, the elastic band may have a width that extends across a trough of the saddle shape.

According to this aspect, the width of the elastic band may extend between 5% and 50% of a distance between respective attachment points of the fabric to the headband on opposite sides of the trough of the saddle shape.

According to this aspect, the width of the elastic band may extend between 10% and 30% of the distance between the attachment points.

According to this aspect, the elastic band may be one of a plurality of elastic bands stretching between the ends of the support structure.

According to this aspect, the fabric and elastic band may be configured to be resiliently deformable into an airgap within the headband.

According to this aspect, the fabric may have a C-shaped cross section in the saddle shape.

According to this aspect, the C-shaped cross section of the fabric and a top surface of the headband may surround the airgap such that the airgap has a D-shaped cross section within the headband.

According to this aspect, the support structure may be rigid plastic and/or metal.

According to this aspect, the fabric may be a breathable or mesh fabric.

According to this aspect, the fabric and the elastic band may be removably replaceable.

According to this aspect, the ends of the support structure may include curved mounting surfaces that are convexly and downwardly curved on a lower side of the rigid structure. The fabric may be mounted to the curved mounting surfaces.

According to another aspect of the present disclosure, a headband for a headset is provided. According to this aspect, the headband may include an elongated and curved support structure having a pair of respective ends, the support structure being coupled at one of the respective ends to an earcup of the headset. The headband may further include an elastic band coupled to and stretching between the respective ends of the support structure, the elastic band being concave down in shape. The headband may further include a fabric coupled to the support structure at locations above the elastic band and extending to wrap underneath at least a portion of the elastic band to form a saddle shape, the saddle shape supporting the elastic band from the underside at least at a head-contacting portion of the headband.

According to this aspect, the earcup may be one of a pair of earcups, and each of the pair of earcups may be coupled to one of the respective ends of the support structure.

According to this aspect, the elastic band and the fabric may be biased against each other, such that the elastic band pushes down against the fabric in tension and the fabric pulls up in tension against the elastic band.

According to this aspect, the fabric and elastic band may be configured to be resiliently deformable into an airgap within the headband.

According to this aspect, the fabric may have a C-shaped cross section in the saddle shape.

According to another aspect of the present disclosure, a headset including first and second earcups and a headband is provided. According to this aspect, each earcup may include an audio transducer configured to emit audio to a respective ear of a user. The headband may include an elongated and curved support structure that is coupled at each of a pair of respective ends to the earcups. The headband may include an elastic band coupled to and stretching between the ends of the support structure, the elastic band being concave down in shape. The headband may further include a fabric coupled to the support structure at locations above the elastic band and extending to wrap underneath at least a portion of the elastic band to form a saddle shape. The saddle shape may support the elastic band from the underside at least at a head-contacting portion of the headband. The elastic band may have a width that extends across a trough of the saddle. The fabric and elastic band may be configured to be resiliently deformable into an airgap within the headband. The elastic band and the fabric may be biased against each other, such that the elastic band pushes down against the fabric in tension and the fabric pulls up in tension against the elastic band.

"And/or" as used herein is defined as the inclusive or V, as specified by the following truth table:

| A | B | A V B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A headset, comprising:

an earcup, the earcup including an audio transducer configured to emit audio to a respective ear of a user; and a headband including an elongated and curved support structure having a pair of respective ends, the headband being coupled at one of the respective ends to the earcup, wherein the headband comprises an elastic band coupled to and stretching between the ends of the support structure, the elastic band being concave down in shape, the headband further comprises a fabric coupled to the support structure at locations above the elastic band and extending to wrap underneath at least a portion of the elastic band to form a saddle shape, the saddle shape supports the elastic band from the underside at least at a head-contacting portion of the headband, the elastic band has a width that extends across a trough of the saddle shape, and the width of the elastic band extends between 5% and 50% of a distance between respective attachment points of the fabric to the headband on opposite sides of the trough of the saddle shape.

2. The headset of claim 1, wherein the earcup is one of a pair of earcups, and each of the pair of earcups is coupled to one of the respective ends of the support structure.

3. The headset of claim 1, wherein the elastic band and the fabric are biased against each other, such that the elastic band pushes down against the fabric in tension and the fabric pulls up in tension against the elastic band.

4. The headset of claim 1, wherein the width of the elastic band extends between 10% and 30% of the distance between the attachment points.

5. The headset of claim 1, wherein the elastic band is one of a plurality of elastic bands stretching between the ends of the support structure.

6. The headset of claim 1, wherein the fabric and elastic band are configured to be resiliently deformable into an airgap within the headband.

7. The headset of claim 6, wherein the fabric has a C-shaped cross section in the saddle shape.

8. The headset of claim 7, wherein the C-shaped cross section of the fabric and a top surface of the headband surround the airgap such that the airgap has a D-shaped cross section within the headband.

9. The headset of claim 1, wherein the support structure is rigid plastic and/or metal.

10. The headset of claim 1, wherein the fabric is a breathable or mesh fabric.

11. The headset of claim 1, wherein the fabric and the elastic band are removably replaceable.

12. The headset of claim 1, wherein the ends of the support structure include curved mounting surfaces that are convexly and downwardly curved on a lower side of the support structure, and wherein the fabric is mounted to the curved mounting surfaces.

13. A headset, comprising:

an earcup, the earcup including an audio transducer configured to emit audio to a respective ear of a user; and a headband including an elongated and curved support structure having a pair of respective ends, the headband being coupled at one of the respective ends to the earcup, wherein the headband comprises an elastic band coupled to and stretching between the ends of the support structure, the elastic band being concave down in shape, the headband further comprises a fabric coupled to the support structure at locations above the elastic band and extending to wrap underneath at least a portion of the elastic band to form a saddle shape, the saddle shape supports the elastic band from the underside at least at a head-contacting portion of the headband, and the fabric and the elastic band are removably replaceable.

14. The headset of claim 13, wherein the elastic band is one of a plurality of elastic bands stretching between the ends of the support structure.

15. The headset of claim 13, wherein the fabric and elastic band are configured to be resiliently deformable into an airgap within the headband.

16. The headset of claim 15, wherein the fabric has a C-shaped cross section in the saddle shape.

17. The headset of claim 16, wherein the C-shaped cross section of the fabric and a top surface of the headband surround the airgap such that the airgap has a D-shaped cross section within the headband.

18. The headset of claim 13, wherein the support structure is rigid plastic and/or metal.

19. The headset of claim 13, wherein the fabric is a breathable or mesh fabric.

20. A headset, comprising:

an earcup, the earcup including an audio transducer configured to emit audio to a respective ear of a user; and a headband including an elongated and curved support structure having a pair of respective ends, the headband being coupled at one of the respective ends to the earcup, wherein the headband comprises an elastic band coupled to and stretching between the ends of the support structure, the elastic band being concave down in shape, the headband further comprises a fabric coupled to the support structure at locations above the elastic band and extending to wrap underneath at least a portion of the elastic band to form a saddle shape, the saddle shape supports the elastic band from the underside at least at a head-contacting portion of the headband, the ends of the support structure include curved mounting surfaces that are convexly and downwardly curved on a lower side of the support structure, and the fabric is mounted to the curved mounting surfaces.

* * * * *